United States Patent Office 3,388,992
Patented June 18, 1968

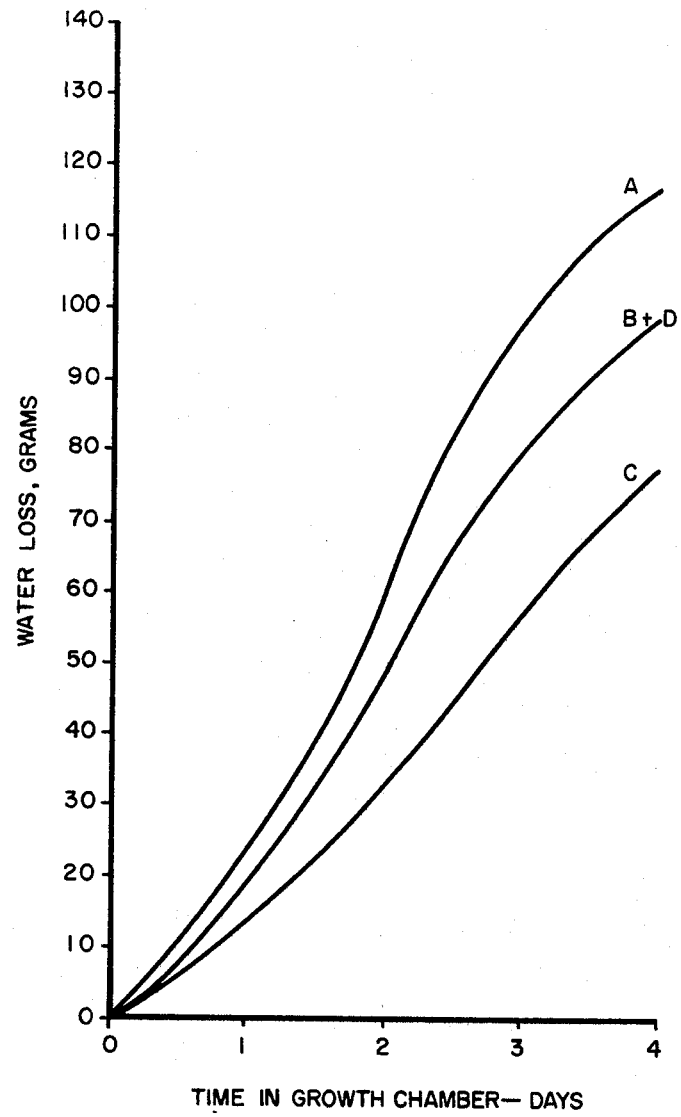

3,388,992
METHOD OF REDUCING PLANT
TRANSPIRATION
Edward L. Ratledge, Claymont, Del., assignor to Sun Oil
Company, Philadelphia, Pa., a corporation of New
Jersey
Continuation-in-part of application Ser. No. 469,870,
July 6, 1965. This application May 15, 1967, Ser.
No. 638,288
3 Claims. (Cl. 71—127)

ABSTRACT OF THE DISCLOSURE

A process for enhancing the effectiveness of a prepared antitranspirant composition consisting essentially of a wax and oil-in-water emulsion containing 0.25 to 5.0 parts wax and oil per 100 parts water, said wax being a petroleum wax having a melting point in the range of 122°–160° F. and said oil being a petroleum hydrocarbon oil having a maximum of 8.0 weight percent gel aromatics and a distillation range at 10 mm. Hg abs. of 300°–500° F. which process comprises admixing 0.25 to 1.0 part of unemulsified petroleum oil of the same characteristics as that disclosed above to the preformed wax and oil-in-water emulsion immediately before applying the emulsion to growing plants and thereafter applying said preformed emulsion with the additional oil to the plants.

Cross reference to related applications

This application is a continuation-in-part of my copending patent application Serial No. 469,870, filed July 6, 1965, and is directed to an improvement in the process therein disclosed.

Background of the invention

This invention relates to an improved method for stimulating plant growth. This invention particularly relates to a process using compositions of emulsified wax and oil to stimulate plant growth by regulation of plant transpiration.

It is generally known that growing plants are continually losing water by a process known as transpiration. It is not generally realized, however, that the loss of water is very large and often constitutes a serious danger to the well-being of the plant. Most of the water which is taken in by the roots and carried up the vascular tissues is lost into the air. Microscopic examination of the structure of a leaf shows why this occurs. The cells of the mesophyll (the green parenchyma between the epidermal layers of a foliage leaf) are in contact with air over much of their total surface. The cell walls of the mesophyll are moist, and the water in them evaporates into the air just as water in any sort of sponge or open container evaporates if it is in contact with air. As the walls begin to dry out, more water diffuses into them or is imbibed by them from the water within the plant.

The amount of transpiration under average conditions is surprisingly large. A sunflower may transpire 276 grams of water per square meter of leaf surface per hour. A single corn plant may transpire as much as fifty gallons of water in a growing season and a field of corn can transpire enough water during a single growing season to cover the ground on which it grows with seven inches of water. This water is, of course, absorbed from the soil in which the plant grows.

Water evaporates from a plant for the same reasons and in much the same manner as it evaporates from an open dish or from a wet cloth. However, the rate of transpiration is not constant. It is most rapid in high temperature, strong wind, bright light, and low humidity, that combination of factors which most favors evaporation. If any one of these factors varies, the rate of transpiration varies accordingly.

Different plants vary greatly in the rates at which they transpire. Plants with thick, heavily cutinized leaves and relatively few stomata and air spaces (such as pines) transpire less rapidly than those with delicate leaves well provided with stomata and containing large air spaces. In fact, the ability of certain plants to live in very dry regions is dependent partly on their relatively slow transpiration.

If the leaves transpire more rapidly than the roots absorb water or the stem conducts it, then the water content of the plant decreases. Such a decrease in water content first causes the growth of the plant to stop; and if it is continued, the plant wilts. Efforts are made, therefore, by growers of plants to prevent such results, either by adding water to the soil or by reducing transpiration. The transpiration from a plant may be reduced by removing some of the leaves; this is frequently done during transplanting, when the absorptive system (root system) has been partly destroyed in handling the plants. The same result is accomplished by plants by the shedding of leaves during a prolonged drought. Transpiration may be reduced also by shading the plant, as is accomplished by white-washing greenhouses in the summer, by increasing the humidity of the air surrounding the plant, by lowering the temperature, or by protecting the plant from the wind (as is done, for example, in orchards, by wind breaks).

As described above, transpiration takes place from two specific areas of foliar plants; that is, the cuticle and the stomata of the leaves.

Through the layer of cuticle forming the surface of all mature leaves some water escapes into the air. This loss of water through the cuticle is spoken of as cuticular transpiration, to distinguish it from water loss through the stomata which is called stomata transpiration. The principal means by which plants reduce cuticular transpiration is the thickening of the outer wall of the epidermal cells, the presence of large quantities of the wax-like material, cutin, in this wall, and the production of the close-set rods of wax (the so-called "bloom") which occurs on many fruits, leaves, and stems and which has the appearance of a very fine powder.

Plants which grow in arid or semi-arid regions normally have some degree of the above-described transpiration control mechanism built into their foliage. However, plants such as ornamentals or vegetables which normally grow in areas of plentiful rainfall do not normally contain this protective mechanism to any significant degree. Therefore, when these plants are subject to unusual or prolonged dry spells, or are transplanted into a dry area, severe damage with the resulting losses of these valuable crops often occurs.

The U.S. Department of Agriculture recently conducted a study of plant transpiration and published its findings in Production Research Report Number 87, entitled "Research in Plant Transpiration: 1962." The report states on pages 42 and 51:

"Several (antitranspirant) compounds are presently marketed by commercial companies. These compounds, which are latexes, waxes, and plastics, are generally applied in foliar sprays or dips. Some are widely used by horticulturists for reducing transpiration of transplants, bulbs, and Christmas trees. High costs of these compounds prevent extensive use in the fields of forestry and agronomy. There is also a paucity of published information on the efficiency of the compounds as antitranspirants. For this reason it was deemed necessary to evaluate them as potential transpiration suppressants.

"Specific information pertinent to each compound tested was supplied by the manufacturer and is included in the appendix. These materials were tested at the manufacturer's recommended rate of dilution on beans, *Phaseolus vulgaris* L. variety red kidney, and on corn, *Zea mays* verieth Dixie 82. These plants grow and transpire rapidly; therefore, they are excellent for evaluation studies. Transpiration before and after spraying was obtained by weight differences. (Page 42.)

"Compounds evaluated as transpiration suppressants included several latex and plastic compounds, waxes, mer- Most of them did not reduce transpiration without also depressing plant growth. In some cases temperature of cury and fluoride compounds, and α-hydroxysulfonates. treated leaves was elevated to the 'kill point' when the plants were placed under high light." (Page 51.)

All of the above clearly points out the continuing and ever present problem of crop damage due to excessive water losses by growing plants during droughts or prolonged dry spells. As can be seen in the excerpts from the U.S. Department of Agriculture report, the problem of sustaining plant growth by regulation of transpiration without retarding or damaging the plant treated still exists.

It is recognized that waxes and oils alone or in combination have previously been utilized in the treatment of some plants. For example, U.S. Patent 1,875,473 teaches stimulating growth of plants by subjecting the plants to vapors of shale oil in a controlled environment. This method may be effective in controlled environments such as a greenhouse; however, no large scale application of this process is practicable.

U.S. Patent 2,284,970 relates to a method for regulating the abscisson layer in growing plants by treatment with an auxin and more especially to a carrier for the auxin which upon drying will form a protective coating so as to insure that the auxin will be absorbed by the plant.

The carrier disclosed in this patent consists of an emulsion containing from 23 to 40 parts wax or wax and oil per 47 to 71 parts of water. The plant treatment consists of coating said plant with the carrier containing an auxin, at a time prior to that at which abscisson of plant leaves takes place. The object of using the wax-oil emulsion as a carrier for the auxin is to provide a flexible water soluble coating on the plant which protects the auxin and enables the plant to absorb the auxin at a constant and continuous rate until the supply of auxin is exhausted. Although apparently effective for its intended purpose, it can be readily recognized that the carrier compositions disclosed in this patent do not provide, nor were they intended to provide, a means of regulating plant transpiration.

U.S. Patent 3,129,429 relates to a method of regulating the time at which blossoms form on fruit trees. The process involves coating trees with low melting point wax to inhibit early blossoming and subsequent late frost damage to trees. The two critical elements of this invention are tht the tree must be coated with the protecive coating compositions prior to budding and the wax used to coat the trees must melt within a temperature range which is normally conducive to plant growth in order to be effective, i.e., within the range of 70°–120° F.

As is disclosed above in the U.S. Department of Agriculture report and the noted U.S. patents, wax and/or oil coatings have been previously used to achieve various favorable reactions in plant culturing. However, until now no effective method of stimulating plant growth by the regulation of plant transpiration has been discovered. I have now discovered compositions and methods to achieve this goal.

Summary of the invention

The present invention comprises a method for regulating moisture transpiration of foliar plants thereby stimulating the growth of the plant. The present invention relates to an improved method for the application to growing plants of an antitranspirant composition comprised of petroleum wax and hydrocarbon oil-in-water emulsion. The petroleum wax of the compositions used in the present invention is characterized as having a melting point in the range of 122°–160° F., and the petroleum oil is characterized as having a maximum of 8.0 weight percent gel aromatics and a distillation range at 10 mm. Hg abs. of 300°–500° F. The wax and oil concentration in the emulsion is in the range of 0.25 to 5.0 parts by weight per 100 parts of water. Specifically the present invention relates to a process for regulating transpiration of foliar plants utilizing the preformed emulsion described above wherein just prior to application of the preformed emulsion to the growing plant an additional 0.25 to 1.0 part of unemulsified oil of the same type as used in the preformed wax and oil emulsion is admixed into the emulsion and the whole composition is then applied to the plants to be treated.

Description of the invention

The drawing is provided to illustrate and compare the water losses of tomato plants treated in accordance with the present invention. Curve "A" illustrates the water losses via transpiration of untreated tomato plants and serves as a control. Curve "B–D" illustrates transpiration water losses for plants treated according to the methods disclosed in U.S. patent application 469,870 upon which the present invention is an improvement. Curve "C" illustrates the lower water losses resulting from the improved retardance of plant transpiration achieved by the method of the present invention.

I have now discovered a method which most nearly reproduces the antitranspirational mechanisms found in plants adapted to moisture-poor or arid environments. By the method of the present invention, any foliar plant can be protected during its growth periods against damaging water losses due to excessive transpiration during prolonged dry spells. This protection is achieved without inhibiting plant growth and in effect the method of the present invention promotes the growth and the fruit or vegetable production of that plant.

Plant transpiration regulation by the method of the present invention can comprise a single application of the preformed emulsion having added unemulsified oil dispersed therein or a specifically timed series of applications. Using either procedure the concentration of wax and oil in the plant treating composition used is an important part of the present invention.

The compositions used in the process of the present invention are comprised of dilute emulsions of specific concentrations and ratios of petroleum wax and specific petroleum hydrocarbon oils in water. The compositions used in the process of the present invention more specifically are comprised of the above-disclosed preformed emulsion to which has been added just prior to application of the preformed emulsion to the plants to be treated, 0.25 to 1.0 part of unemulsified oil per 100 parts of the preformed emulsion. Petroleum waxes usable in the compositions used in the method of the present invention have a melting point in the range of 122°–160° F. These petroleum waxes are primarily crystalline and distillate paraffin waxes which are obtained from well known dewaxing procedures from waxy lubricating oils such as by solvent dewaxing with a methyl ethyl ketone-toluene mixtures, methyl isobutyl ketones, propane, and the like. The precipitated wax crystals are removed by centrifuging or filtering to form slack wax. Slack wax usually contains up to 20 weight percent oil and can be further purified to form scale wax and refined wax which normally contains less than 0.5 weight percent oil. These waxes are well known articles of commerce.

The petroleum hydrocarbon oil component of the compositions used in the method of the present invention, which can serve as the oil used in the wax and oil emulsion as well as the oil added to the preformed emulsion just prior to applying the emulsion to the plant foliage, preferably is a solvent refined fraction of petroleum oil composed primarily of paraffinic and naphthenic hydrocarbons and containing less than 8 weight percent of aromatics. This petroleum oil fraction is characterized as follows:

| | |
|---|---|
| Gravity, °API/60° F. | 31.0–36.0 |
| Viscosity, SUS/100° F. | 60–120 |
| Viscosity, SUS/210° F. | 34–38 |
| Flash point, ° F. | 300–400 |
| Fire point, ° F. | 375–400 |
| Pour temperature, ° F. | −10–+20 |
| Unsulfonated residue, wt. percent (ASTM) | 92.0–99.9 |
| Refractive index, 77° F. | 1.4660–1.4690 |
| Gel aromatics, wt. percent max | 8.0 |
| Distillation range at 10 mm. Hg Abs. (ASTM D1160) ° F. | 300–500 |

Two particularly important elements of the present invention are the melting range of the wax used and the composition of the petroleum hydrocarbon oil which is used. First it is important that the thin film deposited on the surface of the plants treated according to the method of the present invention maintain its film-like characteristics during the time of transpiration regulation on the plant. If the melting point of the wax used in the coating is too low, the wax can become liquid at temperatures favorable to plant growth which happening removes the transpiration regulation qualities from the film coating which renders the coating ineffective for its intended purpose. Also this resulting liquid from the melted wax under some circumstances can penetrate the cuticle of the leaf and interrupt the normal metabollic processes of the plant. Therefore, it is critical that the melting point of the wax used in the compositions of the present invention be no lower than 122° F.

The compositions used in the method of the present invention are wax and oil-in-water emulsions. Ionic or nonionic surface active compounds can be employed as emulsifying agents, normally in the concentration range of 1 to 10 parts by weight of emulsifying agent for every 100 parts of wax and oil in the emulsion composition.

Surface active agents are suitable as a class for use according to the present invention. The nature of surface active agents is well known, and such agents generally have an oleophilic portion of the molecule, usually of hydrocarbon nature, and another polar portion of the molecule, which may be provided by various functional groups such as hydroxyl, sulfate, carboxyl, carbonyl, amino, nitro, amido, ether, sulfonate, phosphate, phosphite, etc. Examples of suitable classes of surface active agents which can be employed are: alkali metal salts of fatty acids, alkali metal salts of sulfated fatty acids, fatty acid glycerides, sulfonated or sulfated fatty acid esters or amides, alkali metal alkyl sulfates, alkali metal alkyl sulfonates, alkali metal aryl sulfonates, alkali metal alkyl-lauryl sulfonates, quaternary ammonium halides, akali metal salts of alkylated naphthalene, sulfonic acid, polyethylene sorbitol esters of fatty acids, fatty acid amides or alkanol amines, condensation products of ethylene oxide and polyalkylene glycols, sorbitan esters, alkyl substituted phosphoric acids, alkali metal salts of alkyl phenol sulfonates, etc. Examples of individual surface active agents, which can be employed are given for example in Kirk et al., Encyclopedia of Chemical Technology, vol. 13, pages 515–517 (1954).

Particularly suitable surface active agents for use according to the invention are the polyalkyl amines and fatty acid amines, sorbitan esters of polyoxyethylene glycol, and others of which numerous examples are given in the Kirk et al. disclosure referred to in the preceding paragraph.

The compositions of the present invention are normally prepared as an emulsion concentrate which can then be diluted to the preformed emulsion containing the desired amount of wax and oil in water. The concentration of wax and oil in water of the final coating product is an essential part of the present invention. If the concentration of wax and oil is too high in the coating emulsion at the time of application, the detrimental effects noted in the United States Department of Agriculture Report cited supra can result. Therefore, it is an essential and critical part of the present invention that the final concentration of emulsified wax and oil in the preformed emulsion for plant application be no greater than a total of 5.0 parts of wax and oil in 100 parts of water by weight. Plant growth stimulation can be realized by application of an emulsion coating composition containing as little as 0.25 part of wax and oil in 100 parts of water. However, the preferred concentration range of wax and oil in water as a plant treating emulsion is from one part wax and oil in 100 parts of water to 2.5 parts of wax in oil in 100 parts of water.

The ratio of emulsified wax to emulsified oil in the preformed emulsion composition can vary from 1 part wax to 39 parts oil up to 39 parts wax to 1 part oil by weight according to the desired application. Therefore, the wax and oil emulsion used in the method of the present invention can contain 0.125 to 4.875 parts of emulsified wax per 100 parts of water and 0.125 to 4.875 parts of oil per 100 parts of water. Therefore, the sum total of emulsified wax and emulsified oil in the final dilution of the emulsion composition for foliar application cannot exceed 5.0 parts of water for purposes of the present invention.

However, the quantity limitation to the quantity oil in the emulsified form in the preformed emulsion does not include unemulsified oil which can be admixed into the preformed emulsion just prior to plant application. This quantity of 0.25 to 1.0 part unemulsified oil added to the preformed emulsion is over and above the quantity of emulsified oil in the emulsion.

The unemulsified oil is mixed into the diluted wax and oil-in-water emulsion with light agitation just prior to applying the emulsion to the foliar plants. It is believed that large droplets of the unemulsified oil are dispersed uniformly throughout the emulsion.

The mechanism by which the addition of the unemulsified oil to the wax and oil-in-water emulsion just prior to application of the emulsion is not fully understood. It is believed that the unemulsified oil when homogeneously dispersed in the diluted wax and oil emulsion serves to more effectively wet the foliar surfaces of the plant and thereby provide more uniform coating by the wax and oil emulsion thus resulting in more effective regulation of the plants transpiration without inhibiting plant growth.

To illustrate the present invention, the following examples are given.

EXAMPLE I

At a temperature of 160° F. 30 parts of petroleum paraffin wax having a melting point of 126° F. were blended with 30 parts of a petroleum oil fraction of the following characteristics:

| | |
|---|---|
| Gravity, ° API/60° F. | 34.6 |
| Viscosity, SUS/100° F. | 70.4 |
| Viscosity, SUS/210° F. | 36.5 |
| Flash point, ° F. | 355 |
| Fire point, ° F. | 395 |
| Pour temperature, ° F. | −5 |
| Unsulfonated residue, wt. percent | 95.3 |
| Refractive index, 77° F. | 1.4685 |
| Gel aromatics, wt. percent | 7.7 |
| Distillation range at 10 mm. Hg ° F. | 356–475 |

To this blend were added 3.5 parts of polyoxyethylene (20) sorbitan monooleate which is commercially sold under the trade name "Tween 60" by Atlas Powder Company, 3.5 parts of sorbitan monostearate which is commercially sold under the trade name "Span 60" by Atlas Powder Company, and 40 parts of water which had been preheated to the temperature of a wax-oil blend. The resulting mixture was then agitated to produce a homogeneous stable wax and oil emulsion concentrate.

This concentrate was then diluted with water to a final composition of 0.5 part wax and oil to 100 parts water. Pepper plants which were being grown in sash beds and which had blossomed and started to bear fruit were transferred from the sash beds in which they were growing to open fields during the month of May, in an area which was experiencing a period of below normal rainfall. Approximately one acre of land was utilized for these pepper transplants which were planted 4 feet apart in 50 foot rows. One-half of the plants transplated were sprayed with the above plant growth stimulating composition in the amount of 100 gallons per acre.

Standard commercial agricultural spray apparatus was used in the present application and in general is suitable for the purposes of the present invention.

The plants of the other half of the acre were left untreated to serve as a control. Sixteen days after treatment all of the plants were harvested.

The plants of the untreated half of the acre yielded an average of 4 full grown peppers per 50-foot row of plants. The average weight of peppers harvested per 50-foot row of plants was 1.0 pound. The harvest from the plants of the treated half of the acre yielded an average of 18 full grown peppers per 50-foot row which peppers average 4.5 pounds per 50-foot row of plants harvested. This fourfold increase of fruit yield in a given amount of time under identical growing conditions clearly demonstrates the plant growth stimulating effect of the process and compositions given in this invention. This example sets forth the method and compositions of U.S. patent application Serial No. 469,870 of which the present case is a continuation in part. The following example illustrates the improvement achieved by the method of the present invention over the process disclosed in the above-noted parent patent application.

EXAMPLE II

A growth chamber provided with facilities to maintain a controlled environment was set up to provide the following conditions:

Relative humidity, 80%
12 hours of daylight (provided by special electrical lights to simulate sunlight)
12 hours of night (lights off)
Temperature during daylight hours, 80° F. (lights on)
Temperature during night hours, 60° F. (lights off)

Forty tomato plants averaging approximately 6 to 8 inches in height, each separately growing in a 250 ml. soil filled flower pot, were transferred from a green house to the test chamber and separated into 4 lots of 10 which are designated as lots A, B, C, and D. The lots were tested in the following manner.

Lot A: these plants were given no treatment and provided a control.

Lot B: these plants were sprayed with the composition disclosed in Example I in the identical manner as disclosed in Example I.

Lot C: these plants were treated in the identical manner as the plants of Lot B with the exception that just prior to spraying the plants with the dilute wax and oil-in-water emulsion unemulsified oil of the characteristics disclosed in Example I was blended with the emulsion in the amount of 0.25 part oil per 100 parts of emulsion.

Lot D: a composition identical to that of Example I with the exception that the emulsion concentrate was prepared with 60 parts of oil instead of 30 as disclosed in Example I. The emulsion concentrate was diluted to a concentration of 0.75 part emulsified wax and oil in 100 parts of water and applied to this lot of tomato plants in the identical manner as disclosed for Lot B.

The moisture of the soil for each potted tomato plant was set at field capacity. Each pot was then individually sealed inside a polyethylene film wrapper with the stem and foliar parts of the tomato plant being outside of the film and subject to ambient conditions of the growth chamber.

The potted tomato plants were then subject to growing conditions in the growth chamber as described above. Each individual plant was weighed at the beginning of the period and again at 24-hour intervals thereafter for a period of four days. The measured weight loss after each 24-hour time interval was attributed to water losses via transpiration. The results of these measurements are illustrated in the drawing.

Now referring to the drawing the curve labelled "A" represents the average weight loss for the plants of Lot A. The curve labelled "B–D" represents the average water loss for the plants of Lots "B" and "D," each of which nearly average the same loss rate and can therefore be represented by a single curve. Curve "C" represents the average water loss for the plants of Lot "C."

The rate of plant water loss of Lots B, C, and D as represented by curves "B" and "C–D" when compared with the control as represented by curve "A" illustrates that the wax and oil emulsion compositions are effective antitranspirants. Also a comparison of the curve "C–D" with curve "B" further illustrates that the addition of a small quantity of unemulsified oil to the preformed wax and oil emulsion just prior to application of the emulsion of the foliar parts of plants surprisingly further enhances the effect of the antitranspirant. The application of the antitranspirant composition by the method of the present invention results in effective retardance of the water losses of the plant, thereby stimulating plant growth particularly during periods of drought or inadequate rainfall.

Each type of plant has individual requirements as to the total wax-oil concentration in the plant foliar treating emulsion as well as the ratio of wax to oil within that emulsion coating composition. For example, the leaf structure of a tomato plant is distinctly different from the leaf sturcture of a cucumber plant or a corn plant. As previously noted the leaf structure of the plant is an important factor in regulation of transpiration of that particular plant, so that the foliar treating emulsion formulation which most favorably stimulates plant growth for each type of plant should be selected in accordance with the requirements of that plant.

It has also been discovered that often when the more dilute concentrations of the emulsions of the present invention are applied to plants at predetermined time intervals during the growing season, plant growth is more favorably stimulated than when a single application of an emulsion having higher wax-oil concentrations is made.

The process of the present invention is applicable to all foliar plants including vegetables, trees, ornamentals, and grass.

Vegetable plants such as cucumbers, peppers, tomatoes, green beans, spinach, cabbage and others are included as plants that can be treated by the method of this invention. In general all decidious and conferous trees such as oak, elm, maple, spruce, pine, and others are included as plants which can be treated according to the methods of the present invention. All grasses such as fescues, narrow blade and wide blade varieties as well as ornamentals such as flowers and evergreen bushes are included also as plants which can be treated according to the methods of the present invention.

By topical application is meant the act of coating foliar parts of the plants being treated. Topical application can be in the form of dipping, spraying, or any of the many well known methods of treating growing plants.

The amount of the plant growth composition that is needed to protect growing plants is determined by the method of application. When the foliar surfaces of the plants being treated are sufficiently wetted, the application is complete. The amount of treating emulsion necessary to coat an acre of growing plants is dependent upon the size and number of plants per acre in the area being treated, as well as the efficiency of the method being used. These variables are easily determined without excess experimentation.

Other additives which are known plant adjuvants may be included in the compositions used in the method of the present invention. These adjuvants include fungicides such as metal salts and organic complexes of metals; for example, ferric dimethyldithiocarbonate, copper carboate, copper 8-hydroxyquinoleate, copper oleate, copper 3-phenylsalicylate, n-dodecylquanidine acetate, and others.

I claim:

1. In a method of reducing plant transpiration which comprises treating plant foliage with an antitranspirant composition comprising a preformed aqueous emulsion of petroleum wax having a melting point in the range of 122°–160° F., petroleum hydrocarbon oil characterized as having a maximum of 8.0 weight percent gel aromatics and a distillation range at 10 mm. Hg abs. 300°–500° F. and an emulsifying agent, the total concentration of said wax and oil being in the range of 0.25 to 5.0 parts per 100 parts of water and comprising 0.125 to 4.875 parts wax and 0.125 to 4.875 parts oil, the improvement of enhancing the effectiveness of the antitranspirant composition which comprises, just prior to applying said preformed aqueous emulsion to the plant to be treated, mixing into said emulsion 0.25 to 1.0 part per 100 parts of the dilute emulsion of unemulsified hydrocarbon oil of the same characteristics as the oil in the emulsion and thereafter treating said plants with the resulting admixture.

2. A method according to claim 1 wherein said plant is a tomato plant.

3. A method according to claim 1 wherein said plant is a pepper plant.

References Cited
UNITED STATES PATENTS

| | | | |
|---|---|---|---|
| 1,875,473 | 9/1932 | McKee | 71—77 |
| 2,248,400 | 7/1941 | Avery | 71—96 |
| 2,284,970 | 6/1942 | Avery | 71—96 |
| 3,129,529 | 4/1964 | Rumsey et al. | 71—127 |

JAMES O. THOMAS, JR., *Primary Examiner.*